US009604745B2

(12) United States Patent
Goetz

(10) Patent No.: US 9,604,745 B2
(45) Date of Patent: Mar. 28, 2017

(54) LABELING APPARATUS WITH ROBOT AND RELATED METHODS

(75) Inventor: Robert R. Goetz, Garden Grove, CA (US)

(73) Assignee: John Bean Technologies Corporation, Chicago, IL (US)

( * ) Notice: Subject to any disclaimer, the term of this patent is extended or adjusted under 35 U.S.C. 154(b) by 303 days.

(21) Appl. No.: 13/344,998

(22) Filed: Jan. 6, 2012

(65) Prior Publication Data

US 2013/0174960 A1 Jul. 11, 2013

(51) Int. Cl.

| | |
|---|---|
| ***B32B 41/00*** | (2006.01) |
| ***B65C 3/00*** | (2006.01) |
| ***B65C 9/02*** | (2006.01) |
| ***B65C 9/26*** | (2006.01) |
| ***B65C 9/40*** | (2006.01) |

(52) U.S. Cl.

CPC .................. *B65C 3/00* (2013.01); *B65C 9/02* (2013.01); *B65C 9/26* (2013.01); *B65C 9/40* (2013.01)

(58) Field of Classification Search

USPC .. 156/64, 350, 351, 360, 362, 367, 378, 379
See application file for complete search history.

(56) References Cited

U.S. PATENT DOCUMENTS

| | | | | |
|---|---|---|---|---|
| 4,015,366 | A | 4/1977 | Hall, III | 47/1 R |
| 4,465,714 | A | 8/1984 | Petro, IV | 427/424 |
| 5,078,816 | A * | 1/1992 | Ratermann | 156/64 |
| 5,620,519 | A | 4/1997 | Affeldt et al. | 118/669 |
| 5,737,500 | A * | 4/1998 | Seraji | B25J 9/1643 318/568.11 |
| 5,897,797 | A | 4/1999 | Drouillard et al. | 219/121.68 |
| 6,080,250 | A * | 6/2000 | Urban et al. | 156/64 |
| 6,153,253 | A | 11/2000 | Affeldt et al. | 427/8 |
| 6,427,746 | B1 | 8/2002 | Anderson et al. | 156/541 |
| 6,852,186 | B1 * | 2/2005 | Matsuda et al. | 156/230 |
| 7,712,509 | B2 * | 5/2010 | Constantine | 156/582 |
| 2003/0056869 | A1 | 3/2003 | Tate et al. | 156/64 |
| 2006/0048898 | A1 * | 3/2006 | Christie | 156/540 |
| 2010/0101731 | A1 * | 4/2010 | Sleiman et al. | 156/358 |

OTHER PUBLICATIONS

Intelligent Robot Solutions, "Payload: 0.5KG," 2010, 2 pages.

* cited by examiner

*Primary Examiner* — Michael N Orlando
*Assistant Examiner* — Joshel Rivera
(74) *Attorney, Agent, or Firm* — Christensen O'Connor Johnson Kindness PLLC

(57) ABSTRACT

A labeling device may include a platform configured to advance objects, a sensing device directed toward the objects as the objects are advanced, and a label supply. The labeling device may include a robot configured to pick-up labels from the label supply and apply the labels to the objects as the objects are advanced, and a controller configured to operate the robot based upon the vision device.

24 Claims, 4 Drawing Sheets

LABELING APPARATUS WITH ROBOT AND RELATED METHODS

FIELD OF THE INVENTION

The present invention relates to the field of product processing, and, more particularly, to labeling of the products and related methods.

BACKGROUND OF THE INVENTION

A packinghouse is a facility where goods, such as fruit and vegetables, are received and processed prior to distribution to market. In the typical packinghouse, the fruits or vegetables are first received and then sorted based upon several factors, for example, size and quality grade. Once sorted, the fruits or vegetables are moved through the packinghouse via conveyor belts to labeler machines, which place labels on the goods.

During the label application phase of processing, the speed at which the labels are applied, the accuracy of the label application, and the space required by the labeler, i.e. the labeler footprint, may be important. Speed may be important because the fruit or vegetable is to be packed and shipped quickly so that the shelf life in stores will be as long as possible. Accuracy, i.e. the successful application of the proper label to the corresponding fruit or vegetable, may be important for allowing the packinghouse to process produce with a label applied thereto and because packinghouse profitability is adversely affected when a label that would have permitted a higher selling price is not applied to the fruit or vegetable otherwise capable of commanding such higher price.

Space may be important because of the physical configuration of a given packinghouse. The fruit or vegetable can be transported in a series of lanes, each lane conveying the fruit on a plurality of cradles connected to a conveyor belt, each cradle supporting and locating an individual fruit/vegetable. The produce in each lane is sized by conventional methods and subsequently conveyed past a plurality of labelers arranged in series or banks, each of the labelers in the series of labelers being loaded with a different label, i.e. a label imprinted with indicia to identify the size and variety of the fruit or vegetable. The physical arrangement of the packinghouse often limits, without major reconstruction of the building, the number of banks of labelers it is possible to install.

U.S. Pat. No. 6,427,746 to Anderson et al., assigned to the present application's assignee, discloses an example of a labeler for labeling fruit and vegetables. The labeler may include a wheel with a plurality of extendable bellows affixed thereto for placing the labels, i.e. a bellows wheel. With this type of labeler, the bellows wheel rotates individual bellows past a magazine or cassette, which dispenses the labels from a carrier strip. The labels are held in position on the end of the bellows by application of a vacuum to the bellows that is pulled through openings in the end of the bellows. The vacuum also serves to maintain the bellows in a retracted position. As the bellows wheel is rotated, thereby moving a bellows with label dispensed thereon to an application position adjacent a fruit, positive pressure is applied and the bellows is extended to contact the fruit and apply the label thereto.

Although the rotary bellows wheel type labeler has desirable advantages and features, this labeler may have certain drawbacks. For example, the produce is typically manually sorted and singulated, i.e. arranged into series of single file lanes and in individual cradle positions, upstream of the labeler. Each of the labelers is assigned a single lane and typically provides a single label to apply to the produce in the lane. This requires accurate processing upstream to categorize and carry the produce to the appropriate labeler. Of course, this adds cost and complication to the labeling process since each type of fruit to be labeled needs custom conveyors and lanes.

SUMMARY OF THE INVENTION

In view of the foregoing background, it is therefore an object of the present invention to provide a labeling apparatus that is efficient and robust in labeling capabilities.

This and other objects, features, and advantages in accordance with the present invention are provided by an labeling apparatus that may comprise a platform configured to advance a plurality of objects, at least one sensing device directed toward the plurality of objects as the plurality of objects is advanced, and at least one label supply. The labeling apparatus may include at least one robot configured to pick-up labels from the at least one label supply and apply the labels to the plurality of objects as the plurality of objects is advanced, and a controller configured to operate the at least one robot based upon the at least one sensing device. Advantageously, the labeling apparatus has greater range and flexibility for labeling applications, and may not need pre-sorting of the objects, such as fruit or vegetables being labeled.

In some embodiments, the platform may comprise a conveyor configured to advance the plurality of objects along a path of travel. Also, the plurality of objects may comprise objects having different characteristics, and the controller may be configured to operate the at least one robot to apply different respective labels for the objects having the different characteristics. The at least one robot may comprise a plurality thereof, for example.

More specifically, the at least one robot may comprise a motor, a plurality of linking arms coupled to the motor, and a wrist portion coupled to the plurality of linking arms. The wrist portion may comprise a label pick-up device in some embodiments.

In some embodiments, the controller may be configured to cooperate with the at least one sensing device to determine a plurality of object characteristics. The controller may be configured to cooperate with the at least one sensing device to determine a position on the conveyor for each object. The at least one label supply may comprise at least one printable label substrate and a printer head associated therewith. In other embodiments, the at least one label supply may comprise at least one pre-printed label substrate. The plurality of objects may comprise at least one of a fruit and vegetable. In some embodiments, the at least one sensing device may comprise at least one vision device.

Yet another aspect is directed to a method of labeling a plurality of objects. The method may comprise advancing the plurality of objects along a platform, directing at least one sensing device toward the plurality of objects, and for each object, controlling at least one robot to pick-up a selected label from at least one label supply and apply the selected label to the object as the plurality of objects is advanced.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
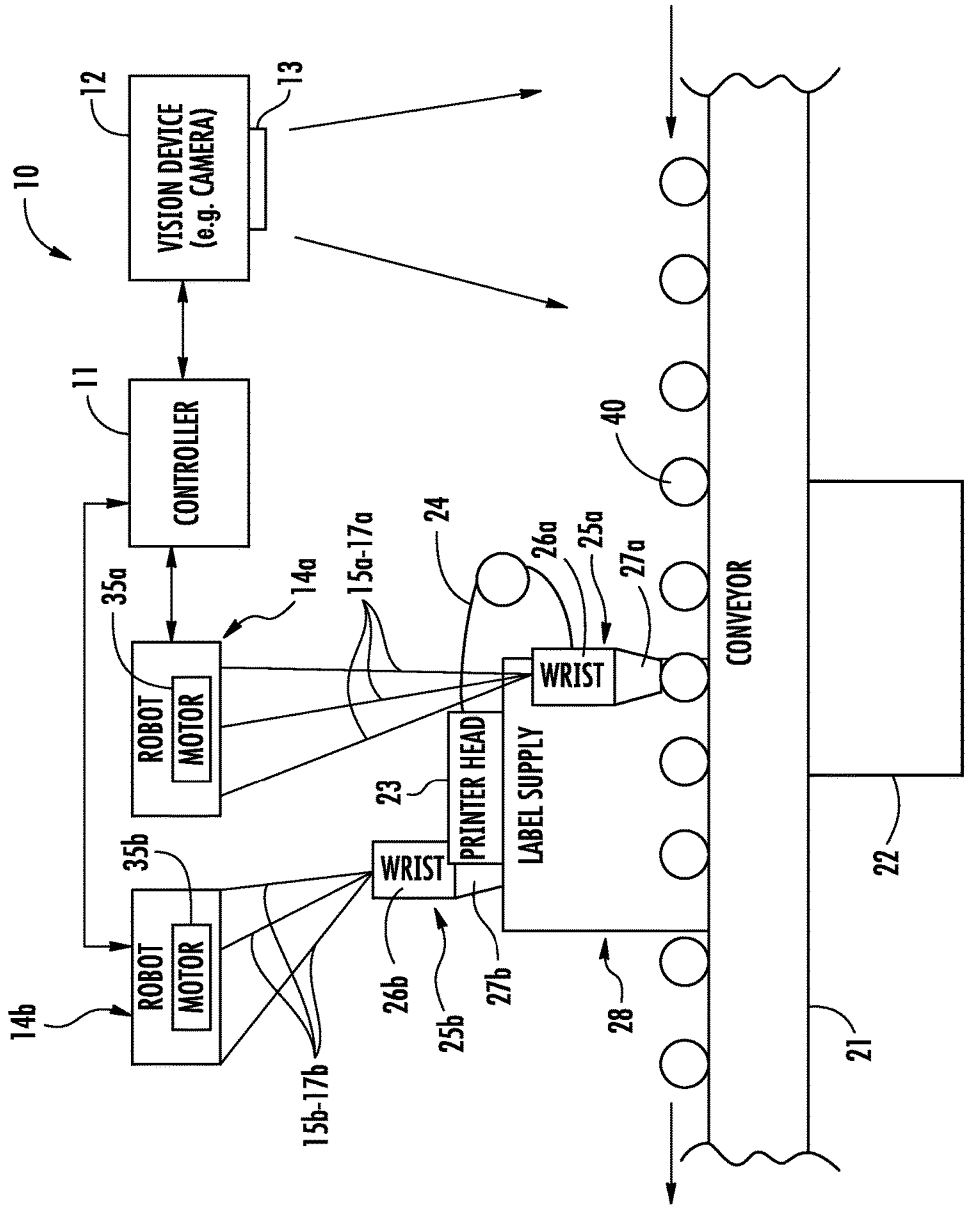
FIG. 1 is a schematic diagram of a side view of a labeling apparatus, according to the present invention.
Figure 2:
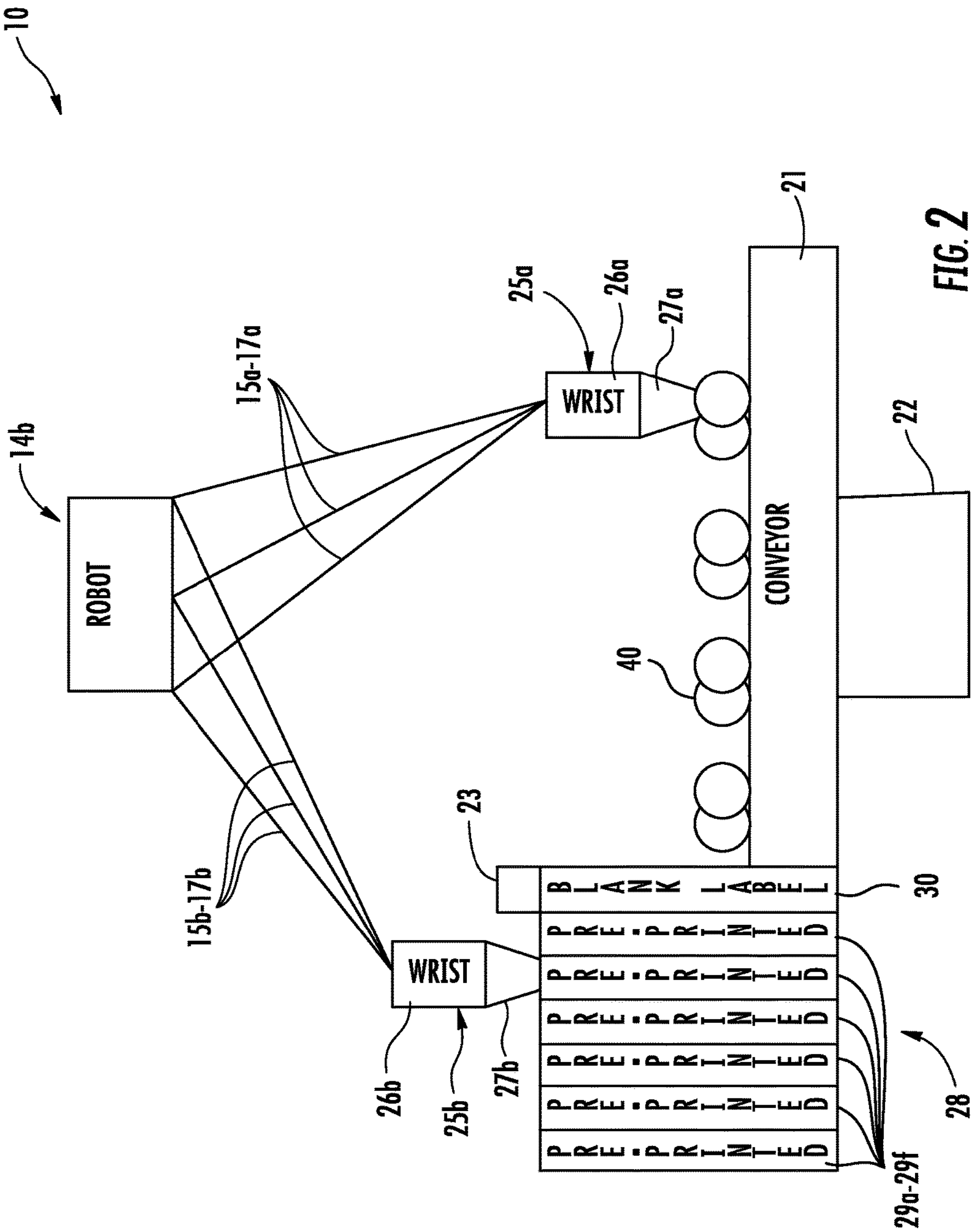
FIG. 2 is a schematic diagram of a front side view of the labeling apparatus of FIG. 1.
Figure 3:
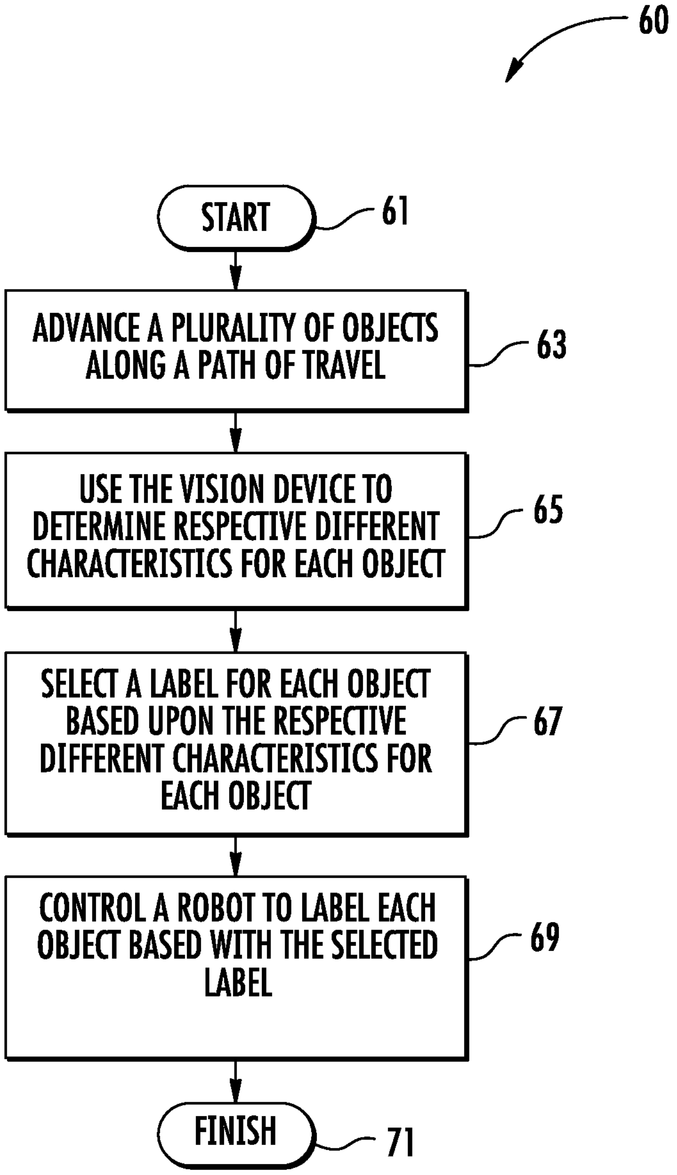
FIG. 3 is a flowchart illustrating a method of labeling using the labeling apparatus of FIG. 1.

Referring initially to FIGS. 1-3, a labeling apparatus 10 according to the present invention is now described. In a flowchart 60, a method of labeling using the labeling apparatus 10 is also now described (Block 61). The labeling apparatus 10 illustratively includes a frame 22, and a platform, which illustratively comprises a conveyor 21, carried by the frame. The conveyor 21 is configured to advance a plurality of objects 40 along a path of travel (Block 63). For example, the objects 40 may comprise organic matter products, fruit products, vegetable products, non-organic products, or any product subject to labeling, etc. The conveyor 21 may comprise an endless conveyor belt or a plurality of rotating longitudinal rollers arranged in side-by-side fashion. The conveyor 21 illustratively causes the objects 40 to move down the path of travel. Of course, the objects 40 need not be arranged in linear lanes, as illustrated, but could be randomly placed on the conveyor 21, i.e. without any ordered arrangement. In some embodiments, the objects 40 may be arranged in trays (e.g. carton trays on the conveyor 21). Indeed, in fruit processing applications, the fruit products could be provided in mass (large numbers) on the conveyor 21 from a chute. Of course, in these embodiments, the chute would include a throttling mechanism to maintain the fruit products to be one level deep on the conveyor 21.

Of course, in other embodiments, the platform may comprise a robotic arm advancing trays of objects 40 one at-a-time, for example, along a semi-circular path of travel from one conveyor to another. In yet other embodiments, the platform may comprise manually providing the objects 40, i.e. the operator would position the tray of objects for subsequent labeling.

The labeling apparatus 10 includes a sensing device 12, and a controller 11 coupled to the sensing device. In the illustrated embodiment, the sensing device 12 comprises a vision device and an associated lens 13 attached thereto, but may alternatively comprise a radar sensing device (e.g. infrared sensing) or any other device capable of detecting accurate position values for the objects 40. Moreover, the vision device 12 is illustratively shown separate from the controller 11 and the robot 14*a*-14*b*, but in other embodiments, the vision device and the controller may all be integrated in the robot. For example, the vision device 12 may comprise a camera, such as an infrared camera or standard visual spectrum camera. The vision device 12 in cooperation with the controller 11 is directed toward the objects 40 as the objects are advanced along the path of travel. More specifically, the vision device 12 in cooperation with the controller 11 analyzes each object 40 and determines a plurality of characteristic values for each object, i.e. the vision device classifies each object (Block 65). The plurality of characteristic values may comprise an object product type value, an object size value, an object conveyor location value (e.g. conveyor x-y coordinates), and/or a quality level value (e.g. produce quality level value).

In other embodiments, the labeling apparatus 10 includes a plurality of vision devices, which may be arranged in series, such as in a staggered arrangement with robots 14*a*-14*b*. In these embodiments, the plurality of vision devices may comprise multiple different types of sensors. In some embodiments, the vision device 12 and the robots 14*a*-14*b* may be arranged in alternating series so that the vision devices can continually update the objects 40 characteristics, such as updated object conveyor location values due to unintended movement from upstream robots and conveyor 21 vibration. In some embodiments, the conveyor 21 may have surface elements configured to reduce vibrational movement of the objects 40.

The labeling apparatus 10 illustratively includes a label supply 28 comprising a plurality of label reels 29*a*-29*f*, 30. The label supply 28 may comprise a multiple reel assembly (frame or housing) for carrying each of the reels.

The labeling apparatus 10 illustratively includes a plurality of robots 14*a*-14*b*. In other embodiments, the labeling apparatus 10 may include only one robot or more than the illustrated two robots. In the illustrated embodiment, the plurality of robots 14*a*-14*b* is arranged in series, i.e. inline. In other embodiments, the plurality of robots 14*a*-14*b* may be arranged in a staggered arrangement or in a side-by-side arrangement (paired arrangement).

More specifically, each robot 14*a*-14*b* illustratively includes a motor 35*a*-35*b*, a plurality of linking arms 15*a*-17*a*, 15*b*-17*b* coupled to the motor, and a wrist portion 25*a*-25*b* coupled to the plurality of linking arms. Each wrist portion 25*a*-25*b* illustratively includes a base portion 26*a*-26*b*, and a fully articulating hand portion 27*a*-27*b* coupled to the base portion and capable of moving in three-axes and rotating. In some embodiments, each wrist portion 25*a*-25*b* may comprise a plurality of articulating hand portions, for example, four hand portions spaced at ninety degrees. This embodiment being particularly advantageous in applications where the objects 40 are arranged in 2×2 cartons. For example, the robot 14*a*-14*b* may be a modified version of the M-1iA model robot, as available from the FANUC Robotics America Corporation of Rochester Hills, Mich. More particularly, a vacuum label pick-up device 27*a*-27*b* is illustratively coupled to the articulating hand portion 27*a*-27*b*. In the illustrated embodiment, the vacuum label pick-up device 27*a*-27*b* is vacuum based, but in other embodiments, the pick-up device may be alternatively mechanical or adhesive based. The vacuum label pick-up device 27*a*-27*b* may comprise an extendable bellows device, for example. In the bellow embodiments, the wrist portion 25*a*-25*b* would include a pressure source or be coupled to a pressure source for extending and retracting the bellows for label pick-up and application. Moreover, in certain embodiments, the multiple reel assembly may comprise a vacuum port adjacent the label pick-up location and associated vacuum source for maintaining the label carrier strip in a proper flush position during label pick-up by the vacuum label pick-up device 27*a*-27*b*.

The robots 14*a*-14*b* are configured to pick-up labels from the label supply 28 and apply the labels to the objects 40 as the objects are advanced along the path of travel. The labeling apparatus 10 illustratively includes a controller 11 configured to operate the robots 14a-14b based upon the vision device 12. In particular, using the vision device 12, the controller 11 determines the plurality of characteristic values for each object 40 as the objects move along the path of travel. Once the characteristic values are determined, the controller 11 accesses an associated memory (not shown), which has stored therein a database of the object types and characteristics values and associated label types from the label supply 28 and their respective reel location in the label supply. The controller 11 selects the label and operates one of the robots 14a-14b to pick-up the selected label from one of the label reels 29a-29f, 30 and apply the label to the particular object 40 (Blocks 67, 69).

In embodiments of the labeling apparatus 10 that include more than one robot 14a-14b, the controller 11 assigns each robot a queue of objects 40 to label, thereby effectively dividing the labeling workload and increasing system throughput. Moreover, since the controller 11 determines an exact conveyor position for each object 40 and has the conveyor speed as a known value, the labeling apparatus 10 has no sorting or singulation requirements as in the typical labeler devices. Indeed, the controller 11 may continuously update each object's 40 conveyor position and provide the robots 14a-14b updated position values during processing.

In addition to the controller 11 selecting the label for application to the object 40, the controller is able to selectively apply the label to different positions on the object. More specifically, since the wrist portion 25a-25b may rotate and have angular movement, the robots 14a-14b may be controlled to apply the selected label at an angle from a top portion of the object 40, i.e., off center label application.

In the illustrated embodiment, the label supply 28 illustratively includes a blank label reel 30, i.e. the label carrier strip of this reel includes a printable label substrate 24. The label supply 28 illustratively includes a printer head 23 associated therewith and cooperating with the controller 11. In particular, the controller 11 may operate the printer head 23 to print a custom label for an object 40, and control one of the robots 14a-14b to pick-up the printed label and apply it to the respective object (Block 71). Each label may comprise a thin pre-printed plastic layer with a pressure sensitive adhesive on a back surface thereof.

Another aspect is directed to a method for making a labeling apparatus 10. The method may include positioning a conveyor 21 to advance a plurality of objects 40 along a path of travel, coupling at least one vision device 12 to be directed toward the plurality of objects as the plurality of objects is advanced along the path of travel, and positioning at least one robot 14a-14b to pick-up labels from the at least one label supply 28 and apply the labels to the plurality of objects as the plurality of objects is advanced along the path of travel. The method also may include configuring a controller 11 to operate the at least one robot 14a-14b based upon the at least one vision device 12.

Advantageously, the labeling apparatus 10 has increased flexibility in labeling capabilities. For example, the objects 40 need not be organized and singulated in a plurality of lanes, as in typical labelers. Moreover, the labeling apparatus 10 can operate proficiently with a plurality of label supplies, and can accurately and quickly apply those labels to the appropriate objects. Also, in the labeling apparatus 10, no upstream categorization or sorting is required as in typical labelers. The labeling apparatus 10 provides an approach to problems of typical labelers, i.e. it removes the need to singulate and categorize the objects upstream of the labeler (thereby reducing the number of lanes and conveyor belts needed in the packinghouse and simplifying packinghouse layout) and it also increases labeling throughput.

Yet another aspect is directed to a method of labeling a plurality of objects 40. The method may comprise advancing the plurality of objects 40 along a path of travel on a conveyor 21, directing at least one vision device 12 toward the plurality of objects, and for each object, controlling at least one robot 14a-14b to pick-up a selected label from at least one label supply and apply the selected label to the object as the plurality of objects is advanced along the path of travel.

Figure 4:
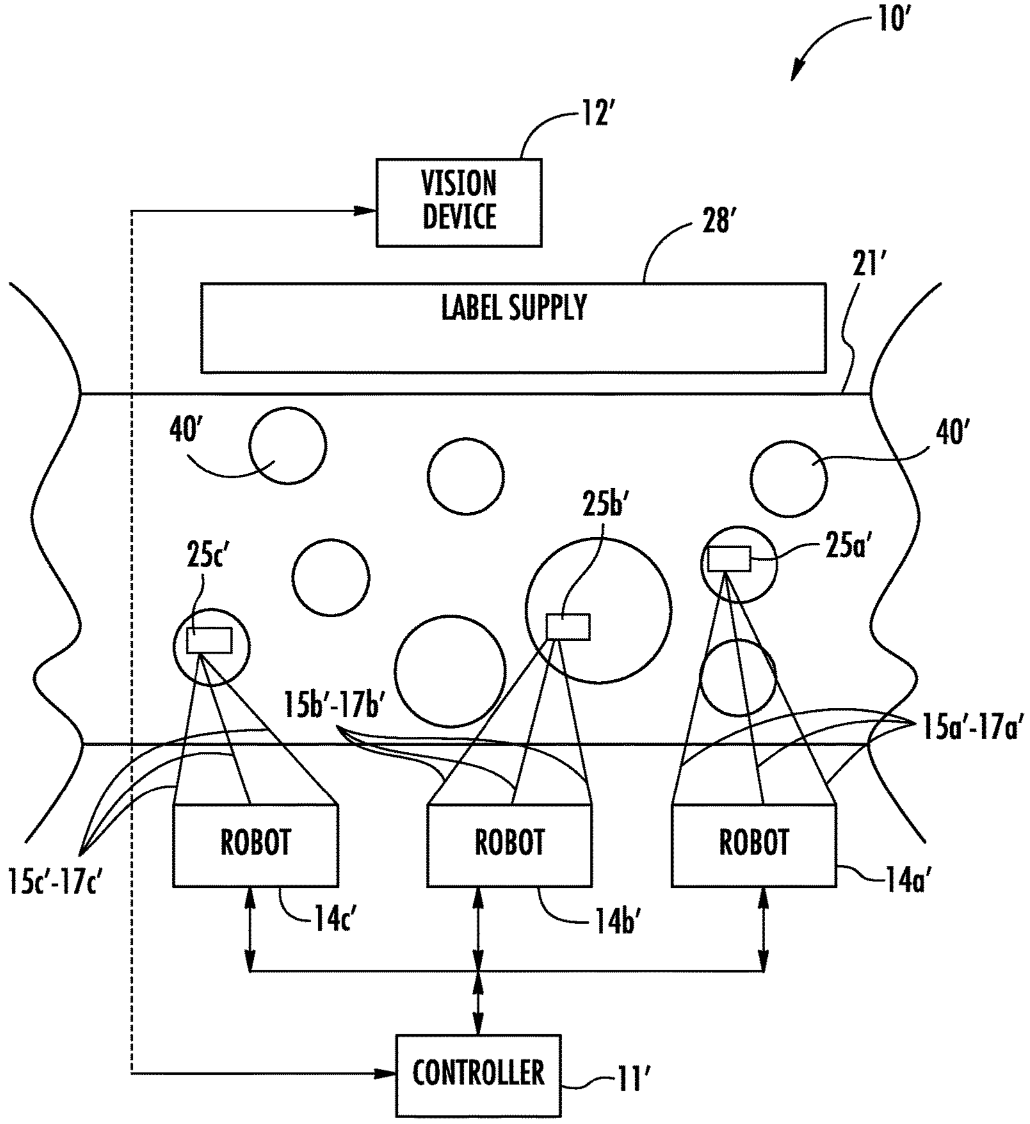
FIG. 4 is a schematic diagram of a top plan view of another embodiment of a labeling apparatus, according to the present invention.

Referring now to FIG. 4, another embodiment of the labeling apparatus 10' is now described. In this embodiment of the labeling apparatus 10', those elements already discussed above with respect to FIGS. 1-2 are given prime notation and most require no further discussion herein. The labeling apparatus 10' includes a conveyor 21' for advancing a plurality of different sized objects 40' along the path of travel. Moreover, this labeling apparatus 10' illustratively includes three robots 14a'-14c' arranged serially in a single conveyor path of travel, each being controlled by the controller 11'. Also, the vision device (sensing device) 12' is depicted offset and is configured to monitor the entire length of the conveyor 21'. Also, the robots 14a'-14c' are shown offset from the conveyor 21' for ease of illustration, but could be positioned directly over the conveyor or adjacent the label supply 28'. As shown, the objects 40' are advanced in a random pattern on the conveyor 21' and may comprise multiple types of objects.

In yet other embodiments, the labeling apparatus may omit the automatic conveyor 21. In these embodiments, the objects 40 are pre-arranged in trays, which are manually positioned under the robot 14a-14b for subsequent labeling. Once the tray of objects 40 is labeled, the tray is removed manually and another trey is placed in position for labeling.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A food labeling apparatus for simultaneously labeling different types of food objects having different physical characteristics, comprising:

a platform configured to simultaneously advance a plurality of different types of food objects positioned in random locations across and along the platform, said plurality of different types of food objects having different physical characteristics;

at least one sensing device directed toward the plurality of different types of food objects to sense the type of food object and the physical characteristics of the sensed type of food object and the locations of the food objects on the platform;

a multiple label supply, comprising a plurality of labels corresponding to the different types of food objects and the different physical characteristics of the different types of food objects to be labeled;

at least one robot structurally separate from the multiple label supply and configured to pick up labels from said multiple label supply and apply the labels to the plurality of randomly positioned different types of food objects as the plurality of food objects are advanced, said at least one robot having a motor, a wrist portion, and a plurality of linking arms, each said linking arm coupled between the motor and the wrist portion, a hand portion coupled to the wrist portion, the wrist portion functioning to enable the hand portion to fully articulate relative to the linking arms, the hand portion movable relative to the at least one label supply, including in directions along the path of travel of the plurality of food objects and transversely to the direction of the path of travel of the plurality of food objects; and a controller configured to operate said at least one robot based upon said at least one sensing device, wherein the controller is configured to cooperate with the at least one sensing device to determine a position on the platform for each food object, said controller being configured to operate said at least one robot to select a specific label applicable to the type and physical characteristics of the food objects to be labeled from the plurality of labels of the label supply and apply the selected label to the food objects using the fully articulable hand portion.

2. The food labeling apparatus of claim 1 wherein said platform comprises a conveyor configured to advance the plurality of food objects along paths of travel.

3. The food labeling apparatus of claim 1 wherein said at least one robot comprises a plurality thereof.

4. A food labeling apparatus comprising:

a platform configured to advance a plurality of food objects;

at least one sensing device directed toward the plurality of food objects;

at least one label supply;

at least one robot structurally separate from the at least one label supply and configured to pick up labels from said at least one label supply and apply the labels to the plurality of food objects as the plurality of food objects are advanced;

a controller configured to operate said at least one robot based upon said at least one sensing device; and wherein said at least one robot comprises a motor, a wrist portion, at least one hand portion attached to the wrist portion, and a plurality of linking arms each having a proximal end and a distal end, the proximal end of each linking arm connected to said motor and the distal end of each linking arm connected to the wrist portion, the wrist portion functioning to enable the hand portion to fully articulate relative to the linking arms.

5. The labeling apparatus of claim 4 wherein said hand portion comprises a label pick-up device.

6. The labeling apparatus of claim 1 wherein said controller is configured to cooperate with said at least one sensing device to determine a plurality of food objects' physical characteristics.

7. The labeling apparatus of claim 1 wherein said label supply comprises at least one printable label substrate and a printer head associated therewith.

8. The labeling apparatus of claim 1 wherein said label supply comprises at least one pre-printed label substrate.

9. The labeling apparatus of claim 1 wherein said at least one sensing device comprises at least one vision device.

10. A food labeling apparatus for simultaneously labeling different types of foods, comprising:

a conveyor configured to simultaneously advance a plurality of different types of foods randomly arranged across and along the conveyor along a path of travel, the plurality of different types of foods each having different physical characteristics;

at least one sensing device directed toward the plurality of different types of foods as the plurality of different types of foods are advanced along their paths of travel, said sensing device sensing the type of food and at least one physical characteristic of the sensed food;

at least one label supply comprising a plurality of labels, said labels corresponding to the sensed type of foods and the at least one sensed physical characteristic of the sensed food to be labeled;

at least one robot structurally separate from the at least one label supply and configured to pick up labels from said at least one label supply corresponding to the different types of foods and the physical characteristics of the different types of foods to be labeled, move the picked-up labels along the path of travel of the sensed foods and transversely to the direction of the path of travel of the sensed foods, and apply specific labels to the sensed foods as the sensed foods are advanced along their paths of travel; and a controller configured to operate the at least one robot based upon said at least one sensing device and to select specific respective labels from the label supply based on the sensed type of food and the at least one sensed physical characteristic of the sensed foods to be labeled and apply the selected labels on the sensed foods, said controller being configured to cooperate with said at least one sensing device to determine the positions on said conveyor for each of the sensed foods.

11. A food labeling apparatus comprising:

a conveyor configured to advance a plurality of foods randomly located along and across the conveyor along paths of travel, the plurality of foods having different physical characteristics;

at least one sensing device directed toward the plurality of foods as the plurality of foods are advanced along the path of travel;

at least one label supply;

a plurality of robots configured to pick up labels from said at least one label supply and apply the specific labels to the plurality of foods as the plurality of foods are advanced along the paths of travel;

a controller configured to operate said plurality of robots based upon said at least one sensing device and to apply different respective labels for the foods having the different physical characteristics; and wherein said at least one robot comprises a motor, a wrist portion, a plurality of hand portions attached to the wrist portion, and a plurality of elongated linking arms, each linking arm coupled at one end to said motor and coupled at the opposite end to the wrist portion, the wrist portion functioning to enable the plurality of hand portions to fully articulate relative to the linking arms.

12. The food labeling apparatus of claim 11 wherein said hand portions comprise label pick-up devices.

13. The food labeling apparatus of claim 10 wherein said controller is configured to cooperate with said at least one sensing device to determine a plurality of food physical characteristics.

14. The food labeling apparatus of claim 10 wherein said controller is configured to cooperate with said at least one sensing device to determine the positions on said conveyor for each food.

15. The food labeling apparatus of claim 10 wherein said at least one label supply comprises at least one printable label substrate and a printer head associated therewith.

16. The food labeling apparatus of claim 10 wherein said at least one label supply comprises at least one pre-printed label substrate.

17. A method of simultaneously labeling a plurality of different types of food objects, comprising:

simultaneously advancing a plurality of different types of food objects on a platform, said food objects of the different types randomly located across and along the platform;

directing at least one sensing device toward the plurality of food objects of the different types to sense the type of food object and to sense one or more specific physical characteristics of the sensed different type of food object; and for each sensed food object, controlling at least one robot having a fully articulating hand portion to pick up a selected label corresponding to the sensed type of food object and to one or more physical characteristics of the sensed type of the different types of food objects from a multiple label supply that is physically separate from the robot, the multiple label supply comprising a plurality of different labels, the labels specific to the type of sensed food object as well as specific to the physical characteristics of the sensed type of food objects, to move the picked-up label longitudinally and laterally relative to the path of travel of the food objects on the platform, and to apply the selected label to the sensed food object as the plurality of different types of food objects are advanced.

18. The method of claim 17, further comprising using a conveyor to advance the plurality of different types of food objects along a path of travel.

19. The method of claim 17, wherein the at least one robot comprises a plurality thereof.

20. The method of claim 17, wherein controlling the at least one robot to pick up the selected label comprises using a label pick-up device of the at least one robot to pick up the selected label.

21. The method of claim 17, wherein controlling the at least one robot to pick up the selected label comprises using the at least one sensing device.

22. The method of claim 17, wherein the plurality of different types of food objects comprise at least one of a fruit and vegetable.

23. The method of claim 17, wherein the at least one sensing device comprises at least one vision device.

24. The food labeling apparatus of claim 1, wherein the different types of food items sensed by the sensing device are selected from the group consisting of different types of fruit products and different types of vegetable products.

* * * * *